United States Patent
Han et al.

(10) Patent No.: US 8,525,963 B2
(45) Date of Patent: Sep. 3, 2013

(54) LIQUID CRYSTAL DISPLAY AND METHOD OF MANUFACTURING THE SAME

(75) Inventors: Kyoung-Tai Han, Suwon-si (KR); Seong-Young Lee, Anyang-si (KR); Hyang-Shik Kong, Seongnam-si (KR); Se-Hwan Yu, Asan-si (KR); Byung-Duk Yang, Yongin-si (KR); Su-Hyoung Kang, Bucheon-si (KR); Kyung-Sook Jeon, Yongin-si (KR)

(73) Assignee: Samsung Display Co., Ltd. (KR)

( * ) Notice: Subject to any disclaimer, the term of this patent is extended or adjusted under 35 U.S.C. 154(b) by 375 days.

(21) Appl. No.: 12/495,828

(22) Filed: Jul. 1, 2009

(65) Prior Publication Data
US 2010/0045918 A1    Feb. 25, 2010

(30) Foreign Application Priority Data
Aug. 20, 2008    (KR) .................. 10-2008-0081475

(51) Int. Cl.
*G02F 1/1343*    (2006.01)
*G02F 1/1339*    (2006.01)

(52) U.S. Cl.
USPC ........................................ 349/139; 349/153

(58) Field of Classification Search
USPC .................. 349/139, 143, 153, 155, 156, 149, 349/151
See application file for complete search history.

(56) References Cited

U.S. PATENT DOCUMENTS

| | | | | |
|---|---|---|---|---|
| 5,416,340 A | * | 5/1995 | Yoshida et al. | 257/59 |
| 5,838,411 A | * | 11/1998 | Hayakawa et al. | 349/139 |
| 6,617,541 B1 | * | 9/2003 | Wadman et al. | 219/121.69 |
| 2006/0114367 A1 | * | 6/2006 | Aramatsu et al. | 349/58 |
| 2006/0146243 A1 | * | 7/2006 | Nakanishi et al. | 349/139 |
| 2006/0192915 A1 | * | 8/2006 | Kimura | 349/151 |
| 2007/0206146 A1 | * | 9/2007 | Wang | 349/151 |

FOREIGN PATENT DOCUMENTS

| | | | |
|---|---|---|---|
| JP | 08201830 A | * | 8/1996 |
| JP | 11-052328 | | 2/1999 |
| JP | 2005-070541 | | 3/2005 |
| JP | 2005-084650 | | 3/2005 |

* cited by examiner

*Primary Examiner* — Edward Glick
*Assistant Examiner* — David Chung
(74) *Attorney, Agent, or Firm* — Cantor Colburn LLP

(57) ABSTRACT

A liquid crystal display capable of reducing the stray capacitance of a non-display region and a method of manufacturing the same. The liquid crystal display includes a first substrate, gate lines and data lines intersecting each other on the first substrate to define pixels, a second substrate arranged opposite to the first substrate, a common electrode formed in a display area of the second substrate in which an image is displayed, and a floating electrode formed in a non-display region of the second substrate in which no image is displayed.

20 Claims, 9 Drawing Sheets

LIQUID CRYSTAL DISPLAY AND METHOD OF MANUFACTURING THE SAME

This application claims priority to Korean Patent Application No. 10-2008-0081475, filed on Aug. 20, 2008, and all the benefits accruing from 35 U.S.C. §119, the contents of which in its entirety are herein incorporated by reference.

BACKGROUND OF THE INVENTION

1. Field of the Invention

The present invention relates to a liquid crystal display and a method of manufacturing the same, and more particularly, to a liquid crystal display capable of reducing the stray capacitance of a non-display region and a method of manufacturing the same.

2. Description of the Related Art

With the improvements made in information technology, there is an increasing demand for display devices having a small size and reduced thickness. However, cathode ray tube ("CRT") displays according to the related art are insufficient to meet this increasing demand. Therefore, flat display devices, such as a plasma display panel ("PDP"), a plasma-addressed liquid crystal display panel ("PALC"), a liquid crystal display ("LCD"), and an organic light-emitting diode ("OLED") device, are in great demand.

In general, a display device includes a lower substrate having thin film transistors arranged thereon, an upper substrate opposite to and facing the lower substrate, and a liquid crystal layer interposed between the two substrates defining a display panel. The display device further includes a gate driver and a data driver for driving the display panel and controls the intensity of an electric field applied to the liquid crystal layer to display an image.

In the display device, the gate driver driving the display panel includes a gate driving integrated circuit ("IC") mounted by a tape carrier package ("TCP") or a chip on glass ("COG") technique. However, other practical methods have been developed in consideration of the manufacturing cost, size of a product, and design. For example, a structure has been proposed in which a gate driver which generates gate signals using an amorphous silicon thin film transistor (hereinafter, referred to as "a-Si TFT"), instead of the gate driving IC, is mounted to a glass substrate on a non-display region of the display panel.

However, when various circuits such as the gate driver are mounted to the glass substrate, capacitors are formed between the circuits and a common electrode of the upper display panel, which affects the driving of the liquid crystal display device. Therefore, a structure capable of reducing the stray capacitance between various circuits on the glass substrate and the common electrode is needed.

BRIEF SUMMARY OF THE INVENTION

Aspects, advantages and features of the present invention provide a liquid crystal display capable of reducing the stray capacitance of a non-display region.

Aspects, advantages and features of the present invention also provide a method of manufacturing a liquid crystal display capable of reducing the stray capacitance of a non-display region.

However, the aspects, advantages and features of the present invention are not restricted to the ones set forth herein. The above and other aspects, advantages and features of the present invention will become more apparent to one of ordinary skill in the art to which the present invention pertains by reference to a detailed description of the present invention provided below.

According to one exemplary embodiment of the present invention, there is provided a liquid crystal display including: a first substrate; a second substrate arranged opposite to the first substrate; a common electrode disposed on the second substrate; and a floating electrode disposed in a non-display region of the second substrate in which no image is displayed.

The common electrode and the floating electrode are disposed on a same layer.

The common electrode is not patterned. The common electrode and the floating electrode are formed by laminating a transparent electrode layer on the entire surface of the second substrate and dividing the layer into the electrodes with a cutting line interposed therebetween. The common electrode and the floating electrode are not patterned. The width of the cutting line is equal to or more than 20 μm. The cutting line is substantially a straight line. The cutting line extends to the end portion of the second substrate from the other end portion. The liquid crystal display comprises a circuit disposed on the first substrate so as to overlap the non-display region. The circuit comprises a gate driver. The circuit comprises a data driver. The liquid crystal display comprises pixel electrodes disposed on the pixels of the first substrate, wherein each of the pixel electrodes has a plurality of patterns, each pattern including a plurality of branches spaced apart from one another extending in a same direction different from a direction of the remaining patterns. The floating electrode is divided into a plurality of parts.

According to another exemplary embodiment of the present invention, there is provided a method of manufacturing a liquid crystal display, the method including: forming gate lines on a first substrate so as to extend in a first direction; forming data lines on the first substrate in a second direction substantially perpendicular to the first direction; forming a transparent electrode layer on a second substrate; and dividing the transparent electrode layer formed as same layer on the second substrate into a common electrode and a floating electrode, wherein the floating electrode is disposed in a non-display region of the second substrate in which no image is displayed A laser may be used to divide the transparent electrode layer into the common electrode spaced apart from the floating electrode. A using method of the laser may be a laser trimming. The method may comprise at least one of the following steps: dividing the floating electrode into a plurality of spaced apart floating electrodes; forming a gate driver on the first substrate so as to overlap the non-display region, wherein the gate driver applies gate signals to the gate lines; forming a data driver on the first substrate so as to overlap the non-display region, wherein the data driver applies data signals to the data lines; and forming pixel electrodes on the pixels of the first substrate, wherein each of the pixel electrodes has a plurality of patterns, each pattern including a plurality of branches spaced apart from one another extending in a same direction different from a direction of the remaining patterns. The width of each branch of each of the patterns may be in a range of about 3 μm to about 5 μm.

BRIEF DESCRIPTION OF THE DRAWINGS

The above and other aspects, advantages and features of the present invention will become more apparent by describing in further detail exemplary embodiments thereof with reference to the attached drawings, in which.

DETAILED DESCRIPTION OF THE INVENTION

Figure 1:
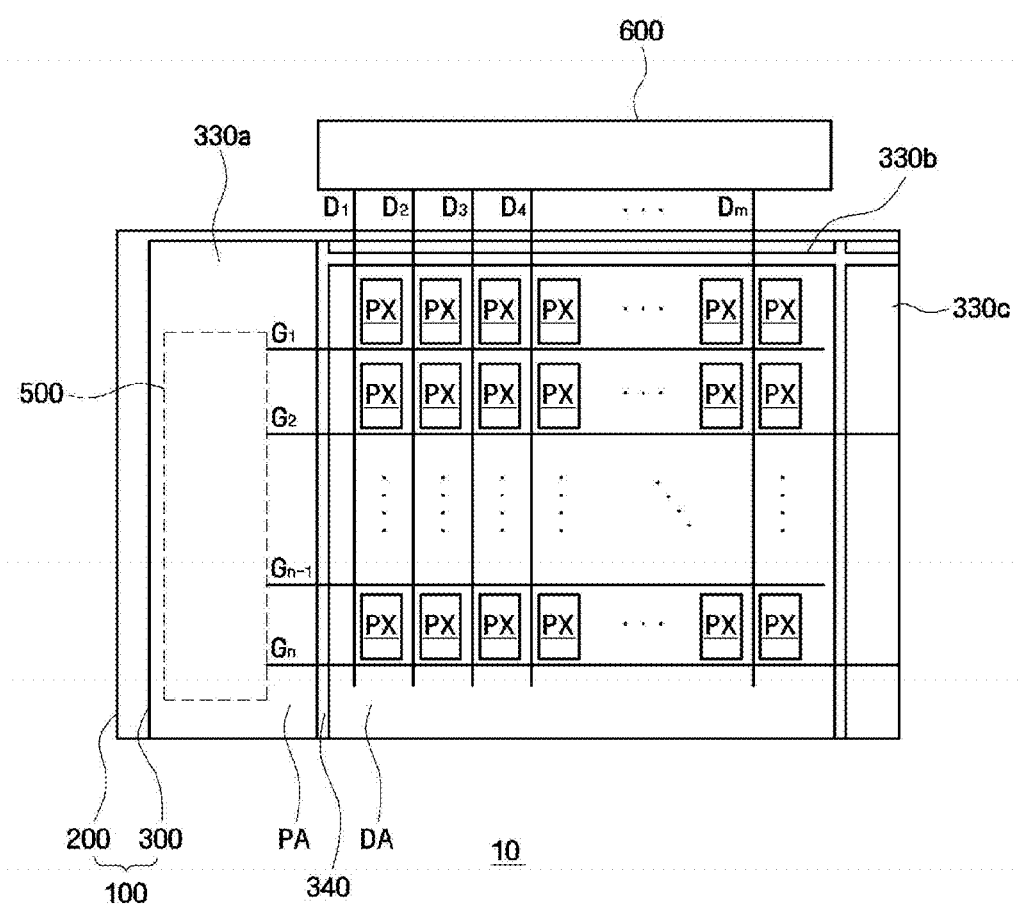
FIG. 1 is a plan view schematically illustrating an exemplary embodiment of a liquid crystal display according to the present invention.

Aspects, advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings. However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

Figure 2:
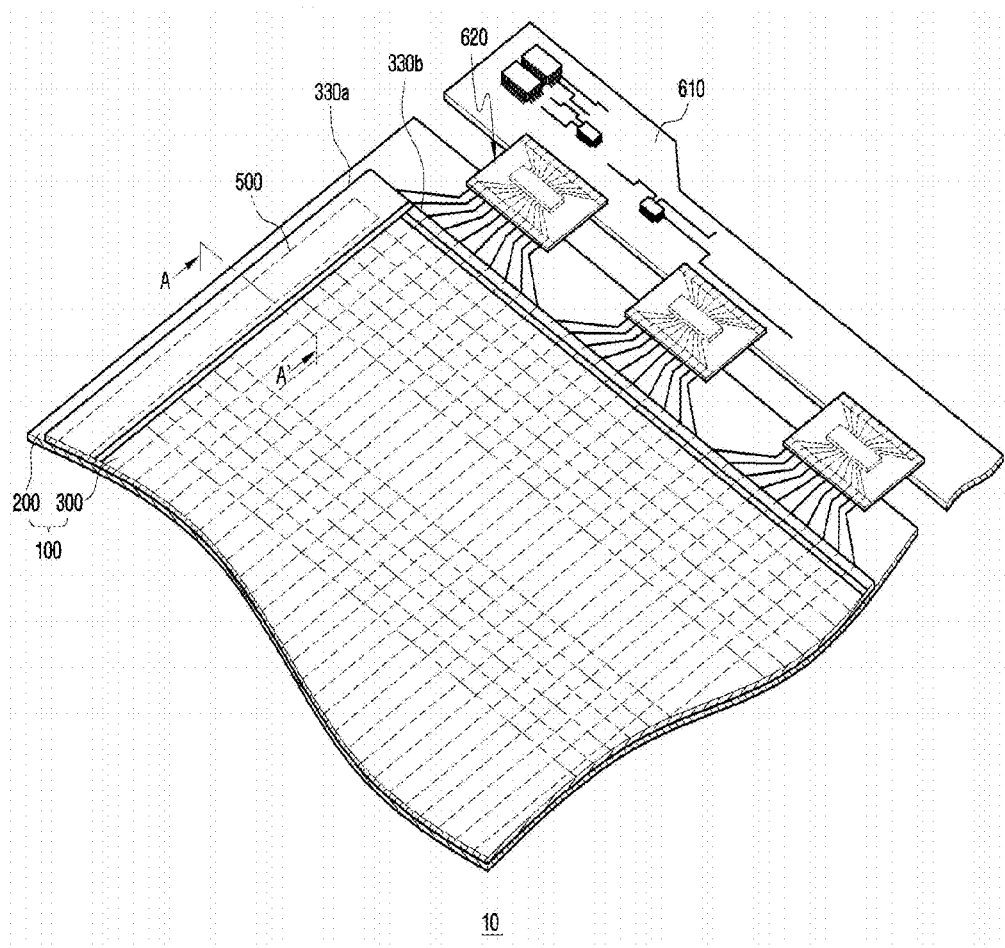
FIG. 2 is a partial perspective view illustrating a liquid crystal panel included in the liquid crystal display of FIG. 1.
Figure 3A:
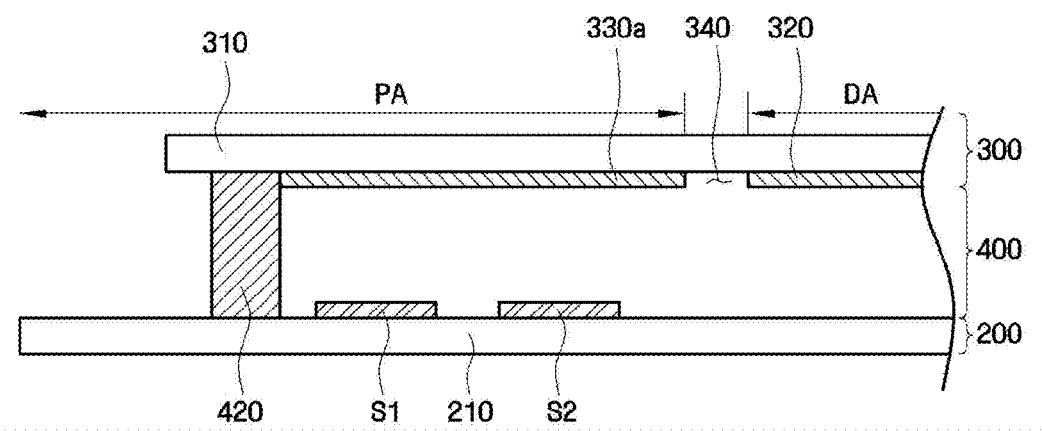
FIG. 3A is a cross-sectional view illustrating the liquid crystal panel taken along line A-A' of FIG. 2.
Figure 3B:
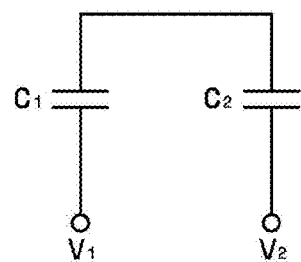
FIG. 3B is a circuit diagram schematically illustrating capacitance between a wiring line and a floating electrode of FIG. 3A.

Hereinafter, an exemplary embodiment of a liquid crystal display according to the present invention will be described in further detail with reference to FIGS. 1 to 3B. FIG. 1 is a plan view schematically illustrating an exemplary embodiment of a liquid crystal display according to the present invention, and FIG. 2 is a partial perspective view illustrating a liquid crystal panel included in the liquid crystal display of FIG. 1. FIG. 3A is a cross-sectional view illustrating the liquid crystal panel taken along line A-A' of FIG. 2, and FIG. 3B is a circuit diagram schematically illustrating capacitance between a floating electrode and a wiring line of FIG. 3A.

A liquid crystal display 10 includes a liquid crystal panel 100, a gate driver 500, and a data driver 600.

The liquid crystal panel 100 includes a lower display panel 200 having gate lines G1 to Gn, data lines D1 to Dm, and pixel electrodes (see reference numeral 295 of FIG. 4) formed thereon, an upper display panel 300 having a common electrode 320 formed thereon, and a liquid crystal layer 400 interposed between the upper display panel 300 and the lower display panel 200. The gate lines G1 to Gn generally extend in a row direction so as to be parallel to each other, and the data lines D1 to Dm generally extend in a column direction so as to be parallel to each other, as illustrated in FIG. 1. The pixels PX are defined at intersections of the gate lines G1 to Gn and the data lines D1 to Dm. The gate lines G1 to Gn and the data lines D1 to Dm maybe formed in a lattice shape.

The data driver 600 supplies an image data voltage to the data lines D1 to Dm. The data driver 600 is an IC and may be connected to the liquid crystal panel 100 in the form of a tape carrier package ("TCP") 620, as illustrated in FIG. 2. The data carrier package 620 may connect a printed circuit board 610 and the liquid crystal panel 100.

The gate driver 500 generates gate signals and sequentially supplies the gate signals to the gate lines G1 to Gn. The gate driver 500 uses, for example, a clock signal, a clock bar signal, and a gate-off voltage to generate the gate signals. The gate driver 500 may include a plurality of stages (not shown) connected to the gate lines G1 to Gn. The stages are cascaded so as to sequentially supply the gate signals to the gate lines G1 to Gn.

The gate driver 500 may be mounted to the lower display panel 200. That is, the gate driver 500 may be formed together with various elements of the lower display panel 200, such as the gate lines G1 to Gn and the data lines D1 to Dm, for example, but not limited thereto.

The liquid crystal panel 300 is divided into a display area DA in which an image is displayed and a non-display area PA (see FIGS. 1 and 3A) in which no image is displayed. The display area DA includes the pixels PX, which are the basic units of images. The pixels PX may be defined at intersections of a plurality of gate lines G1 to Gn and a plurality of data lines D1 to Dm, for example, but is not limited thereto.

The non-display area PA is positioned outside the display area DA, and no image is displayed in the non-display area PA. The non-display area PA may be formed by an overlap between the upper display panel 300 and the lower display panel 200, or it may be an outside region of the lower display panel 200 which is larger than the upper display panel 300. The gate driver 500 may be formed in the non-display area PA. That is, the gate driver 500 may be formed on a portion of the lower display panel 200 corresponding to the non-display area PA.

The upper display panel 300 includes the common electrode 320 formed in the display area DA and floating electrodes 330a, 330b and 330c formed in the non-display area PA. The common electrode 320 forms an electric field together with the pixel electrodes (see reference numeral 295 of FIG. 4) to rotate liquid crystal molecules (see reference numeral 410 of FIG. 5), thereby displaying an image.

The floating electrodes 330a, 330b and 330c are formed in the non-display area PA of the upper display panel 300, or it may be formed so as to overlap the gate driver 500. The floating electrodes 330a, 330b and 330c may be formed in a peripheral portion of the display area DA. For example, the floating electrodes 330a, 330b and 330c maybe formed parallel to the gate lines G1 to Gn or the data lines D1 to Dm.

Next, the relationship between the floating electrodes 330a, 330b and 330c and a circuit unit of the lower display panel 200 will be described with reference to FIGS. 3A and 3B.

The upper display panel 300 and the lower display panel 200 are arranged with a predetermined gap therebetween, and the upper display panel 300 and the lower display panel 200 are adhered to each other with a sealing portion 420 interposed therebetween. The sealing portion 420 bonds the upper display panel 300 and the lower display panel 200 to seal the liquid crystal layer 400 between the two display panels 200 and 300 so as not to be exposed from the liquid crystal panel 100.

The floating electrode 330a is separated and spaced apart from the common electrode 320 with a cutting line 340 interposed therebetween. The floating electrode 330a is separated and spaced apart from the common electrode 320 with a cutting line 340 interposed therebetween. The width of the cutting line 340 may be more than 20 μm. However, there is no specific limit in the width. It is sufficient if the floating electrode can be floated from the common electrode. The cutting line 340 may be a rectilinear or curved figure. The cutting line 340 is formed by a laser without photo process, so it is desirable that it is a rectilinear figure, and is continued from the edge of one side of a panel to the edge of the opposite side.

The floating electrode 330a and the common electrode 320 are transparent electrodes, and they may be formed at the same time. That is, the floating electrode 330a and the common electrode 320 are formed by laminating a transparent conductive layer on the entire surface of the second substrate 310 and dividing the layer into two parts with the cutting line 340 interposed therebetween. One of the two parts overlapping the display area DA serves as the common electrode 320, and the other part overlapping the non-display area PA serves as the floating electrode 330a. A method of forming the common electrode 320 and the floating electrode 330a will be described in further detail below.

The lower display panel 200 includes first and second circuit units S1 and S2 aligned with and overlapped by the floating electrode 330a. The first circuit unit S1 and the second circuit unit S2 mean arbitrary conductive elements. For example, the first and second circuit units S1, S2 may be conductive lines, or elements of the gate driver 500 or the data driver 600. That is, any conductive material may be used for the first circuit unit S1 and the second circuit unit S2 as long as it can be supplied with a voltage to form a capacitance with respect to the floating electrode 330a.

When voltages $V_1$ and $V_2$ are respectively applied to the first circuit unit S1 and the second circuit unit S2, respectively, capacitors $C_1$ and $C_2$ are formed between the first circuit unit S1 and the second circuit unit S2, and the floating electrode 330a, respectively. Since no voltage is applied to the floating electrode 330a, the capacitors $C_1$ and $C_2$ are substantially formed in series between the first circuit unit S1 and the second circuit unit S2. Therefore, the total capacitance $C_{total}$ between the first circuit unit S1 and the second circuit unit S2 satisfies the following expression:

$$\frac{1}{C_{total}} = \frac{1}{C_1} + \frac{1}{C_2},$$

that is, $$C_{total} = \frac{C_1 C_2}{C_1 + C_2}.$$

When a voltage is applied to the electrode overlapping the first circuit unit S1 and the second circuit unit S2, a parallel circuit of capacitors is formed. Therefore, the floating electrode 330a can be used to change the first circuit unit S1 and the second circuit unit S2 to capacitors connected in series to each other, thereby reducing the capacitance.

Figure 4:
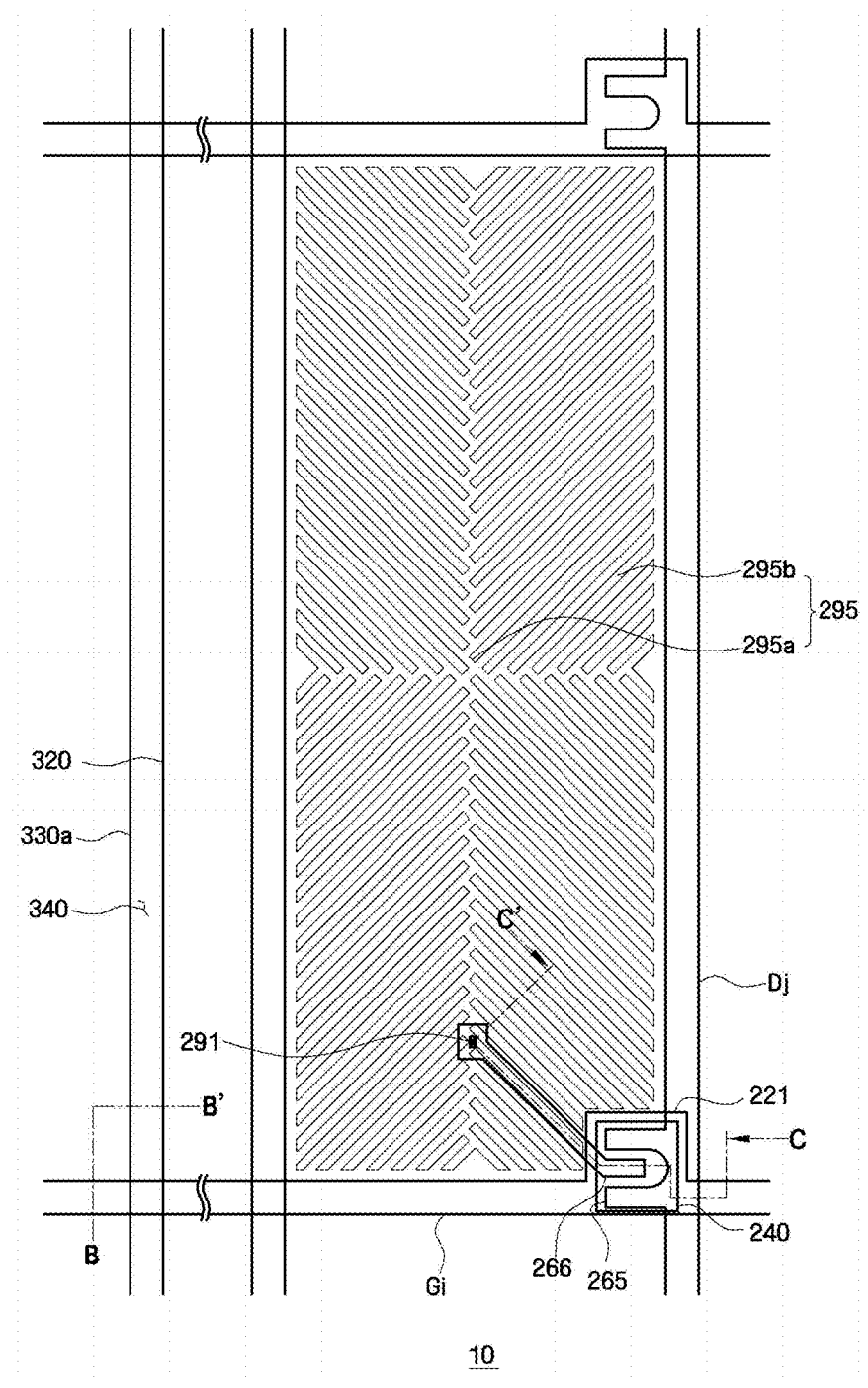
FIG. 4 is a plan view illustrating the liquid crystal display of FIG. 1.
Figure 5:
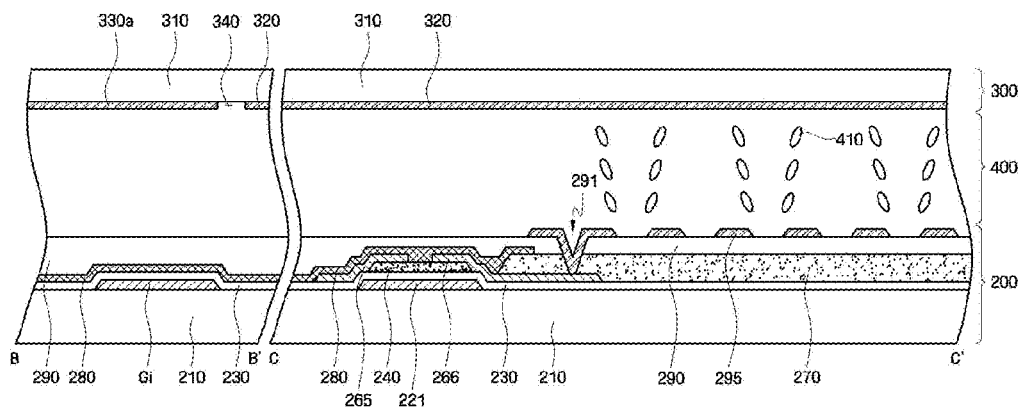
FIG. 5 is a cross-sectional view illustrating the liquid crystal display taken along lines VA-VA and VB-VB of FIG. 4.

Next, the structure of a pixel PX of the liquid crystal display will be described with reference to FIGS. 4 and 5. FIG. 4 is a plan view illustrating an enlarged partial view of the liquid crystal display shown in FIG. 1, and FIG. 5 is a cross-sectional view illustrating the liquid crystal display taken along lines B-B' and C-C' of FIG. 4.

The liquid crystal display 10 includes the lower display panel 200 and the upper display panel 300 opposite to each other as in FIG. 3A, and the liquid crystal layer 400 interposed between the two display panels 200 and 300.

The gate lines Gi are formed on a first substrate 210 and are made of, for example, transparent glass so as to mainly extend in the row direction with reference to FIG. 4. One gate line Gi is allocated to one pixel. A protruding gate electrode 221 is formed on the gate line Gi. The gate line Gi and the gate electrode 221 are referred to as a gate wiring line (Gi and 221).

Although not shown in FIG. 4, storage lines may be formed on the first substrate 210 so as to cross the pixel region substantially in parallel to the gate line Gi. The storage line overlaps a pixel electrode 295 to form a storage capacitor for improving the charge storage capability of the pixel.

The gate wiring line (Gi and 221) may be formed of an aluminum-based metallic material, such as aluminum (Al) or an aluminum alloy, a silver-based metallic material, such as silver (Ag) or an Ag alloy, a copper-based metallic material, such as copper (Cu) or a Cu alloy, a molybdenum-based metallic material, such as molybdenum (Mo) or a Mo alloy, chrome (Cr), titanium (Ti), or tantalum (Ta). In addition, the gate wiring line (Gi and 221) may have a multi-layer structure including two conductive films (not shown) having different physical properties. One of the two conductive films is formed of low-resistivity metal, such as an aluminum-based metal, a silver-based metal, or a copper-based metal, in order to reduce a signal delay or a voltage drop in the gate wiring line (Gi and 221). The other conductive film is formed of a material different from the above, particularly, a material having good contact characteristics with indium tin oxide ("ITO") and indium zinc oxide ("IZO"), such as a molybdenum-based metal, chrome, titanium or tantalum. Examples of a combination of the conductive films include a laminated structure of a lower chrome film and an upper aluminum film or a laminated structure of a lower aluminum film and an upper molybdenum film. However, the present invention is not limited thereto, but the gate wiring line (Gi and 221) may be formed of various metallic materials and conductors.

A gate insulating film 230 made of, for example, silicon nitride (SiNx) or silicon oxide (SiOx) is formed on the gate wiring line (Gi and 221).

A semiconductor layer 240 made of, for example, hydrogenated amorphous silicon or polycrystalline silicon is formed on the gate insulating film 230. The semiconductor layer 240 may have various shapes, such as an island shape or a linear shape. For example, as shown in FIG. 4, the semiconductor layer 240 may be formed in an island shape on the gate electrode 221. The data line Dj, the source electrode 265 and the drain electrode 266 are referred to as a data wiring line. In another exemplary embodiment of the present invention, when the semiconductor layer 240 is formed in a linear shape, it may be provided below the data wiring line (Dj, 265, and 266) so as to extend up to an upper part of the gate electrode 221.

The data line Dj, a source electrode 265, and a drain electrode 266 are formed on the semiconductor layer 240 and the gate insulating film 230. The data line Dj extends in the column direction to intersect the gate line Gi, and the intersection defines a pixel. The source electrode 265 extends in a branch shape from the data line Dj to the upper part of the semiconductor layer 240. The drain electrode 266 is separated from the source electrode 265 and is disposed on the semiconductor layer 240 so as to be opposite to the source electrode 265 with the gate electrode 221 interposed therebetween. The drain electrode 266 includes a rod pattern which is disposed on the semiconductor layer 240 and an expansion pattern which extends from the rod pattern, has a large area, and includes a contact hole 291 formed therein.

In an exemplary embodiment, the data wiring line (Dj, 265, and 266) is formed of refractory metal, such as chrome, molybdenum-based metal, tantalum, or titanium, and may include a multi-layer structure of a lower film (not shown) made of refractory metal and an upper layer (not shown) made of a low-resistivity material. Examples of the multi-layer structure include a two-layer structure of a lower chrome film and an upper aluminum film, a two-layer structure of a lower aluminum film and an upper molybdenum film, and a three-layer structure of a molybdenum film, an aluminum film, and a molybdenum film.

The source electrode 265 overlaps at least a portion of the semiconductor layer 240, and the drain electrode 266 is opposite to the source electrode 265 with the gate electrode 221 interposed therebetween and overlaps at least a portion of the semiconductor layer 240 below the semiconductor layer 240.

A color filter 270 is formed on the data line Dj, the drain electrode 266, and the exposed semiconductor layer 240. The color filter 270 may be formed of a photosensitive organic material, such as photoresist. Any one of the red, green, and blue color filters 270 may be formed for each pixel, and the colors of the color filters 270 formed on the pixels may be arranged in various arrays. The color filters 270 may have the same thickness, or a predetermined step difference.

The color filter 270 may be formed only in the pixel region (see "DA" of FIG. 1), and it may not be formed in the non-display region (see "PA" of FIG. 1).

A black matrix 280 may be formed outside the color filter 270. The black matrix 280 serves as a light-shielding film, and it may prevent light from leaking from regions other than the pixels PX. The black matrix 280 may be formed above a thin film transistor having the gate electrode 221, the source electrode 265 and the drain electrode 266 as three terminals of the thin film transistor. The black matrix 280 may be formed in the non-display area PA, as illustrated in FIG. 5, in order to prevent the leakage of light from the non-display area PA. The black matrix 280 may be formed of an opaque material, such as chrome (Cr), and prevents light leakage to improve display quality. The gate and/or data wiring line may be formed so as to overlap the black matrix 280 in order to maximize the aperture ratio.

A protective film 290 is formed on the black matrix 280 and the color filters 270. The protective film 290 is formed of, for example, an inorganic material composed of silicon nitride or silicon oxide, an organic material having good planarizing characteristics and photosensitivity, or a low-dielectric insulating material, such as a-Si:C:O or a-Si:O:F formed by plasma enhanced chemical vapor deposition ("PECVD"). The protective film 290 may have a two-layer structure of a lower inorganic film and an upper organic film in order to maintain desirable characteristics of an organic film and protect the exposed portion of the semiconductor layer 240.

Contact holes 291 are formed in the protective film 290 and the color filters 270 to expose the corresponding drain electrodes 266.

The pixel electrode 295 is formed on the protective film 290 in each pixel and is electrically connected to the drain electrode 266 through the contact hole 291. That is, the pixel electrode 295 is physically and electrically connected to the drain electrode 266 through the contact hole 291 and supplied with a data voltage from the drain electrode 266. The pixel electrode 295 is made of a transparent conductor, such as indium tin oxide ("ITO") or indium zinc oxide ("IZO").

The pixel electrode 295 includes a connection electrode 295a and a fine pattern of spaced apart branches 295b (FIG. 4). Specifically, the pixel electrode 295 includes the connection electrode 295a at the center of the pixel and the fine pattern 295b which branches off from the connection electrode 295a in four directions (e.g., towards outside corners defining the pixel electrode 295)). The fine pattern 295b is formed by patterning a transparent conductor, such as ITO or IZO, and is formed integrally as unitary indivisible part with the connection electrode 295a.

The fine pattern 295b may be branched in four different directions such that multiple domains can be formed. The angle between the directions in which the fine pattern 295b is branched may be about 90°, for example, but is not limited thereto. The width of each branch 295b defining the fine pattern of branches 295b may be in a range of about 3 µm to about 5 µm.

In the liquid crystal display 10 according to the embodiment of the present invention, the lower display panel 200 includes the pixel electrodes 295, the color filters 270 and the black matrix 280.

The liquid crystal display 10 according to the embodiment of the present invention has a black matrix on array ("BOA") structure in which the black matrix 280 is formed on a thin film transistor array. However, the structure is just an illustrative example, but the liquid crystal display 10 may have a color filter on array ("COA") structure in which the color filters 270 are formed on the thin film transistor array or an array on color filter ("AOC") structure in which the thin film transistor array is formed on the color filters 270.

The upper display panel 300 includes the common electrode 320 and the floating electrodes 330a, 330b and 330c, which are transparent electrodes, on the second substrate 310 made of for example, glass, but are not limited thereto. The common electrode 320 is formed on the entire surface of the display area (see "DA" of FIG. 1). The common electrode 320 is formed in the pixel region without being patterned. The common electrode 320 forms an electric field together with the pixel electrodes 295 to rotate the liquid crystal molecules.

The floating electrodes 330a, 330b and 330c are formed in the non-display area (see "PA" of FIG. 1) of the upper display panel 300. As described above, the floating electrodes 330a, 330b and 330c may be formed so as to overlap various conductive patterns formed in the non-display area. The floating electrodes 330a, 330b and 330c are separated from the common electrode 320 with the cutting portions 340 interposed therebetween. The floating electrodes 330a, 330b and 330c float with respect to a voltage.

Next, an exemplary embodiment of a method of manufacturing the liquid crystal display will be described with reference to FIGS. 5 to 13. FIGS. 6 to 13 are cross-sectional views illustrating the method of manufacturing the liquid crystal display shown in FIG. 1.

Figure 6:
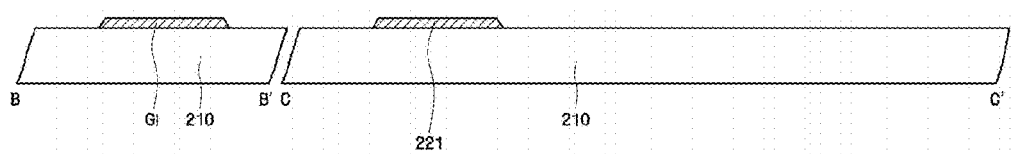
FIGS. 6 to 13 are cross-sectional views illustrating an exemplary embodiment of a method of manufacturing the liquid crystal display of FIG. 1.

First, as shown in FIG. 6, the gate lines Gi and the gate electrodes 221 are formed on the first substrate 210.

The first substrate 210 may be formed of plastic or glass, such as soda lime glass or boro-silicate glass. A sputtering method may be used to form the gate lines Gi. Wet etching or dry etching may be used to pattern the gate lines Gi. When the wet etching is used, an etchant, such as phosphoric acid, nitric acid or acetic acid, may be used. When the dry etching is used, a chlorine etching gas, such as $Cl_2$ or $BCl_3$, may be used.

Figure 7:
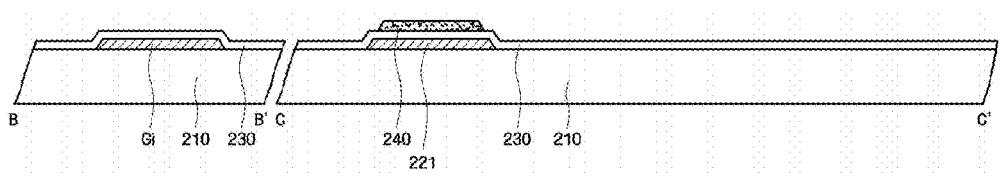

Then, referring to FIG. 7, the gate insulating film 230 made of fluorine-based silicon is formed on the first substrate 210 and the gate lines Gi by, for example, plasma enhanced chemical vapor deposition ("PECVD") or reactive sputtering. Then, the semiconductor layer 240 is formed on the gate insulating film 230. The semiconductor layer 240 may be formed of an oxide semiconductor.

Figure 8:
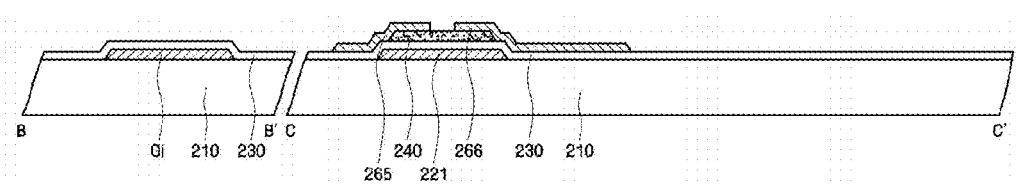

Then, referring to FIG. 8, the data wiring lines (Dj, 265, and 266) are formed on the gate insulating film 230 and the semiconductor layer 240 by, for example, sputtering. The source electrode 265 is separated from the drain electrode 266 with the gate electrode 221 interposed therebetween (and below the source electrode 265 and the drain electrode 266), and the drain electrode 266 extends to the pixel region.

Figure 9:
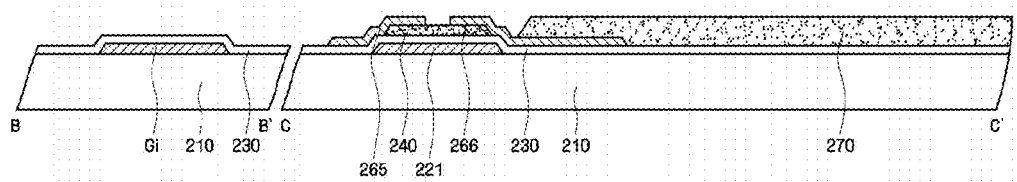

Now referring to FIG. 9, the color filter 270 is formed in the pixel region on the drain electrodes 266 and the gate insulating film 230. The color filter 270 maybe formed of a photosensitive organic material, such as photoresist, for example, by an ink jet method, but is not limited thereto. The red, green and blue color filters 270 are sequentially formed for the pixels. When the color filters 270 are formed of a photosensitive organic material, such as photoresist, different masks are needed for the red, green and blue color filters.

Figure 10:
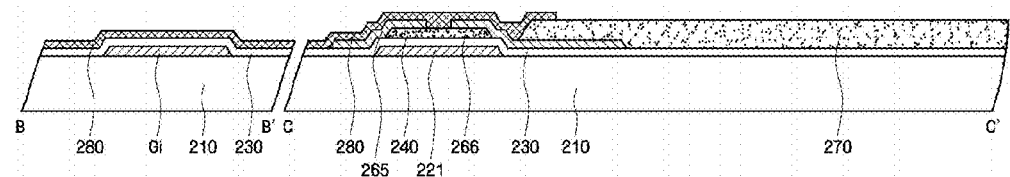

Now referring to FIG. 10, the black matrix 280 is formed on the thin film transistors, each having the gate electrode 221, the source electrode 265 and the drain electrode 266 as three terminals of each thin film transistor, and on the gate wiring lines (Gi and 221) and the data wiring lines (Dj, 265, and 266) so as to overlap the gate and data wiring lines. The black matrix 280 is formed of an opaque material in order to prevent light leakage, and the black matrix 280 may be formed in all regions other than the pixel regions which transmit light.

Figure 11:
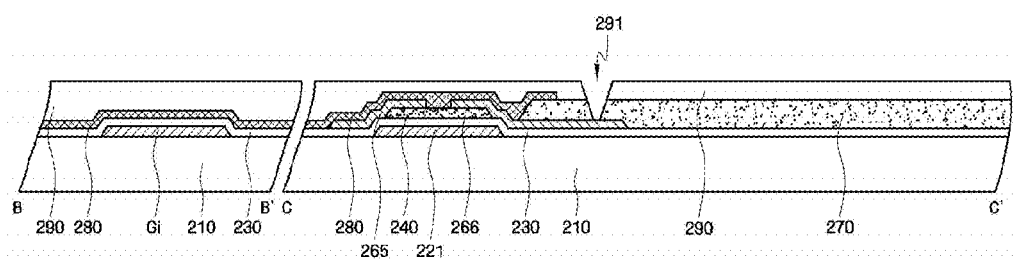

Now referring to FIG. 11, the protective film 290 made of fluorine-base silicon is formed on the structure shown in FIG. 10 by, for example, PECVD or reactive sputtering, but is not limited thereto. Then, the color filters 270 and the protective film 290 are patterned by photolithography to form the contact holes 291 through which the drain electrodes 266 are exposed.

Figure 12:
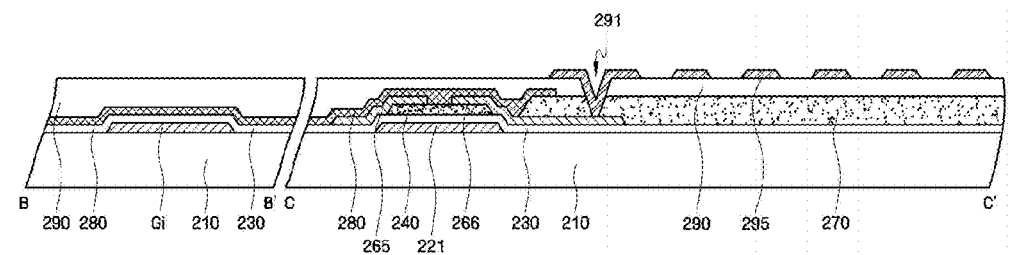

Now referring to FIG. 12, the pixel electrodes 295 are formed on the protective film 290. First, a conductive film for a pixel electrode is formed so as to be connected to a portion of the data wiring line (Dj, 265, and 266), and the conductive film for a pixel electrode 295 is patterned to form the pixel electrodes 295. The pixel electrodes 295 may be formed of a transparent conductor, such as ITO or IZO, or a reflective conductor, such as aluminum, but is not limited to the foregoing.

Figure 13:
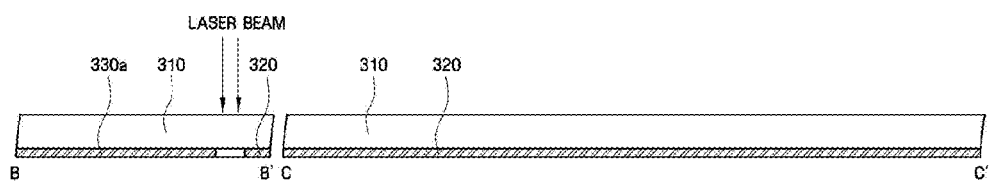

Now referring to FIG. 13, a transparent conductor, such as ITO or IZO, is laminated on the second substrate 310 to form a conductive film for a common electrode 320. A laser beam is radiated onto the conductive film for the common electrode 320 to divide the conductive film for the common electrode 320 into the common electrode 320 and the floating electrodes 330a, 330b and 330c. The cutting portions 340 formed by a laser trimming method are provided between the common electrode 320 and the floating electrodes 330a, 330b and 330c.

Finally, referring to FIG. 5, the structure shown in FIG. 12 and the structure shown in FIG. 13 are arranged opposite to each other, and the liquid crystal layer 400 is interposed therebetween to complete the liquid crystal panel 100.

Figure 14:
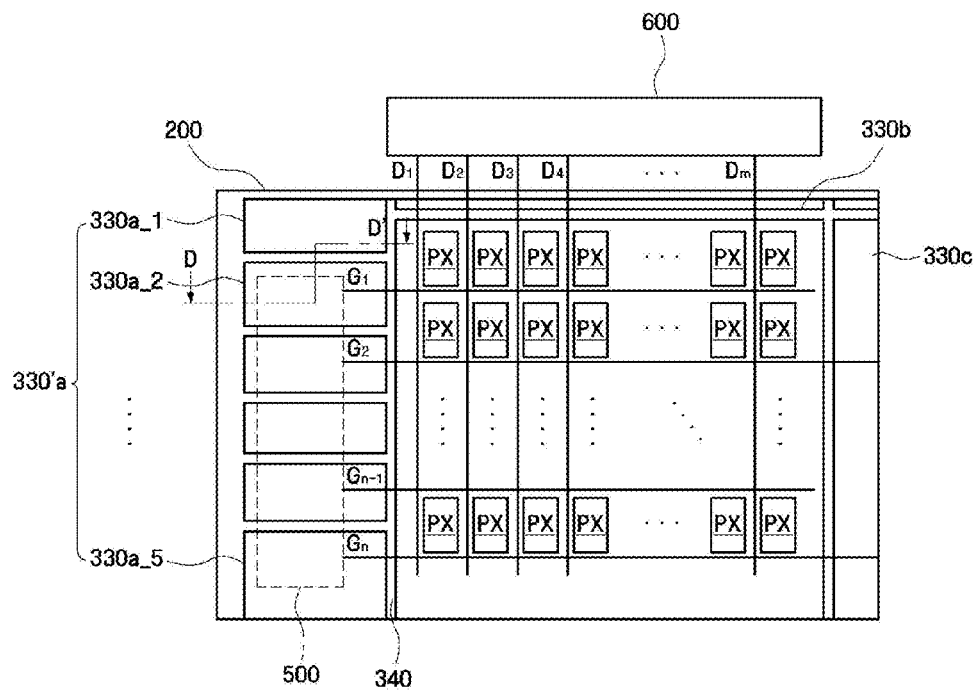
FIG. 14 is a plan view schematically illustrating another exemplary embodiment of a liquid crystal display according to the present invention.
Figure 15:
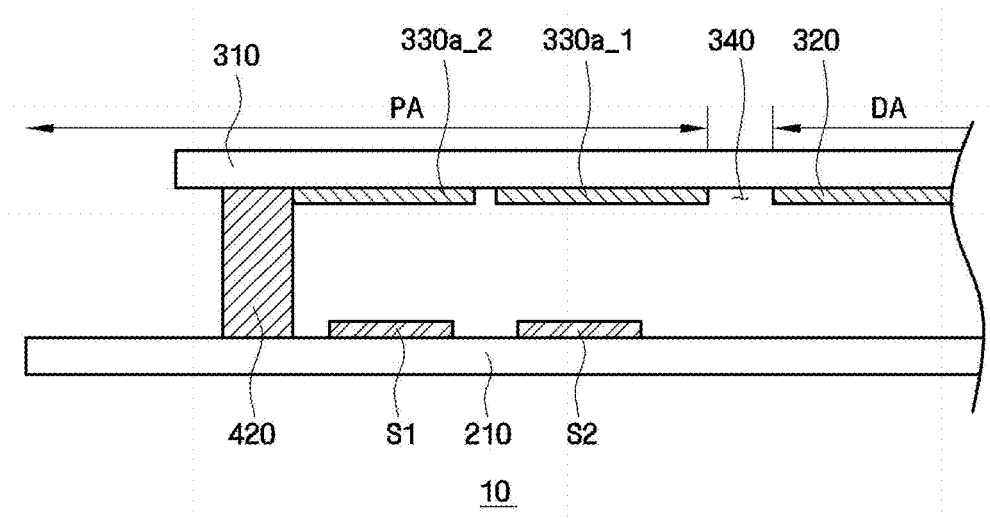
FIG. 15 is a cross-sectional view illustrating the liquid crystal display taken along line XV-XV of FIG. 14.

Next, another exemplary embodiment of a liquid crystal display according to the present invention will be described in further detail with reference to FIGS. 14 and 15. FIG. 14 is a plan view schematically illustrating another embodiment of a liquid crystal display according to the invention, and FIG. 15 is a cross-sectional view illustrating the liquid crystal display taken along line D-D' of FIG. 14. For clarity of description, in this embodiment, components having the same functions as those in the embodiment shown in FIGS. 1 to 5 are denoted by the same reference numerals, and a description thereof will be omitted. Therefore, a description of this embodiment is focused on a difference between the embodiments.

Another embodiment of a liquid crystal display 10 according to the present invention includes a plurality of divided floating electrodes 330'a. For example, the floating electrodes 330'a may be formed so as to extend to be parallel to the gate line G1-Gn or the data line D1-Dm. A plurality of divided floating electrodes 330'a makes it possible to reduce the area of the electrode.

For example, the floating electrodes 330'a may be divided in a direction that is parallel to the gate line G1-Gn. For example, floating electrodes $330a\_1$ to $330a\_5$ may be formed to be parallel to the gate lines G1-Gn in order to prevent coupling between elements of the gate driver 500 connected to the gate lines G1-Gn. However, the direction in which the floating electrodes $330a\_1$ to $330a\_5$ are divided is not limited thereto, but the floating electrodes $330a\_1$ to $330a\_5$ may be divided in any direction, for example, in a direction that is parallel to the data line D1-Dm.

Referring to FIG. 15, the first circuit unit S1 and the second circuit unit S2 overlap different floating electrodes $330a\_1$ and $330a\_2$. Therefore, it is possible to significantly reduce the influence of the stray capacitance of the floating electrodes $330a\_2$ and $330a\_1$ on the first circuit unit S1 and the second circuit unit S2, respectively.

Figure 16:
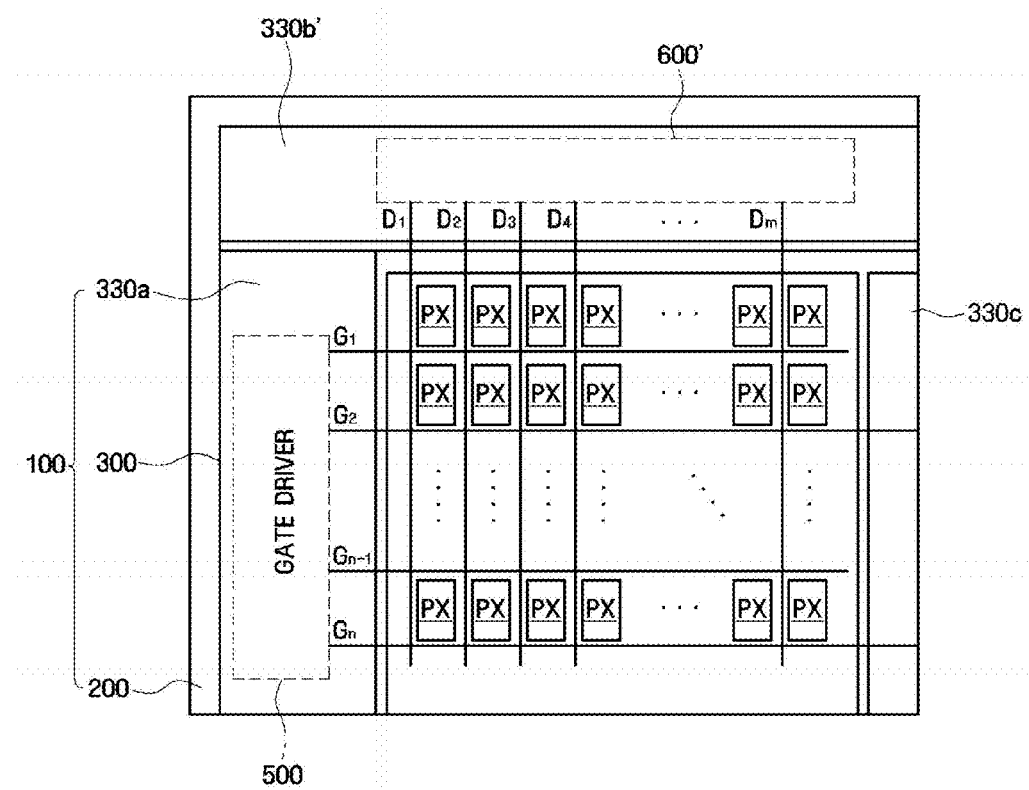
FIG. 16 is a plan view schematically illustrating still another exemplary embodiment of a liquid crystal display according to the present invention.

Next, still another exemplary embodiment of a liquid crystal display according to the present invention will be described in further detail with reference to FIG. 16. FIG. 16 is a plan view schematically illustrating still another exemplary embodiment of a liquid crystal display according to the present invention. For clarity of description, in this embodiment, components having the same functions as those in the embodiment shown in FIGS. 1 to 5 are denoted by the same reference numerals, and a description thereof will be omitted. Therefore, a description of this embodiment is focused on a difference between the embodiments.

In the liquid crystal display according to this embodiment of the present invention, both the gate driver 500 and a data driver 600' are mounted to the liquid crystal panel 100. Specifically, the gate driver 500 and the data driver 600' are mounted to the lower display panel 200, and floating electrodes 330a, 330'b and 330c are formed on the gate driver 500 and the data driver 600'. The floating electrodes 330a, 330'b and 330c may be divided and overlap the gate driver 500 and the data driver 600'. When the floating electrodes 330a, 330'b and 330c overlapping the gate driver 500 and the data driver 600' are separated from each other, it is possible to minimize the influence of the stray capacitance between the gate driver 500 and the data driver 600'.

Each of the floating electrodes 330a, 330'b and 330c overlapping the gate driver 500 and the data driver 600' may be divided into a plurality of segments, as illustrated and described with the embodiment of FIGS. 14 and 15.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display comprising:
a first substrate;
a second substrate arranged opposite to the first substrate;
a common electrode disposed on the second substrate;
a floating electrode disposed in a non-display region of the second substrate in which no image is displayed;
a driving circuit disposed on the first substrate and overlapped with at least a portion of the floating electrode; and
a sealing portion disposed between the first substrate and the second substrate,
wherein at least a portion of the floating electrode is disposed within the sealing portion,
wherein the floating electrode is physically separated from the common electrode,
wherein the driving circuit comprises at least one of a gate driver or a data driver.

2. The liquid crystal display of claim 1, wherein the common electrode and the floating electrode are disposed on a same layer.

3. The liquid crystal display of claim 1, wherein the common electrode is not patterned.

4. The liquid crystal display of claim 1, wherein the common electrode and the floating electrode are formed by laminating a transparent electrode layer on the entire surface of the second substrate and dividing the layer into the electrodes with a cutting line interposed therebetween.

5. The liquid crystal display of claim 4, wherein the common electrode and the floating electrode are not patterned.

6. The liquid crystal display of claim 4, wherein the width of the cutting line is equal to or more than 20 μm.

7. The liquid crystal display of claim 4, wherein the cutting line is substantially a straight line.

8. The liquid crystal display of claim 4, wherein the cutting line extends to the end portion of the second substrate from the other end portion.

9. The liquid crystal display of claim 3, further comprising a circuit disposed on the first substrate so as to overlap the non-display region.

10. The liquid crystal display of claim 9, wherein the circuit comprises a gate driver.

11. The liquid crystal display of claim 9, wherein the circuit comprises a data driver.

12. The liquid crystal display of claim 3, further comprising pixel electrodes disposed on the pixels of the first substrate, wherein each of the pixel electrodes has a plurality of patterns, each pattern including a plurality of branches spaced apart from one another extending in a same direction different from a direction of the remaining patterns.

13. The liquid crystal display of claim 3, wherein the floating electrode is divided into a plurality of parts.

14. A method of manufacturing a liquid crystal display, the method comprising:
- forming gate lines on a first substrate so as to extend in a first direction;
- forming a driving circuit on the first substrate;
- forming data lines on the first substrate in a second direction substantially perpendicular to the first direction;
- forming a transparent electrode layer on a second substrate; and
- dividing the transparent electrode layer formed as same layer on the second substrate into a common electrode and a floating electrode, wherein the floating electrode is disposed in a non-display region of the second substrate in which no image is displayed,
- wherein the floating electrode is physically separated from the common electrode,
- wherein the driving circuit overlaps with at least a portion of the floating electrode and comprises at least one of a gate driver or a data driver.

15. The method of claim 14, wherein a laser is used to divide the transparent electrode layer into the common electrode spaced apart from the floating electrode.

16. The method of claim 14, further comprising dividing the floating electrode into a plurality of spaced apart floating electrodes.

17. The method of claim 14, further comprising forming a circuit on the first substrate so as to overlap the non-display region.

18. The method of claim 17, wherein the circuit comprises a gate driver to apply gate signals to the gate lines.

19. The method of claim 17, wherein the circuit comprises a data driver to apply data signals to the data lines.

20. The method of claim 14, further comprising forming pixel electrodes on the first substrate, wherein each of the pixel electrodes has a plurality of patterns, each pattern including a plurality of branches spaced apart from one another extending in a same direction different from a direction of the remaining patterns.

* * * * *